(12) United States Patent
Kunzinger et al.

(10) Patent No.: US 6,405,222 B1
(45) Date of Patent: Jun. 11, 2002

(54) REQUESTING CONCURRENT ENTRIES VIA BOOKMARK SET

(75) Inventors: Edward Lawrence Kunzinger; Kelvin Roderick Lawrence, both of Round Rock; Herman Rodriguez; Jay Allen Tunkel, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,842

(22) Filed: Dec. 17, 1998

(51) Int. Cl.[7] ............................................... G06F 17/30
(52) U.S. Cl. ..................... 707/501.1; 707/513; 345/793
(58) Field of Search .............................. 707/501.1, 513; 345/793

(56) References Cited

U.S. PATENT DOCUMENTS

| | | | |
|---|---|---|---|
| 5,499,330 A | 3/1996 | Lucas et al. | 707/514 |
| 5,625,781 A | 4/1997 | Cline et al. | 345/854 |
| 5,754,939 A | 5/1998 | Herz et al. | 707/501.1 |
| 5,909,207 A | 6/1999 | Ho | 345/901 |
| 6,088,032 A | 7/2000 | Mackinlay | 707/501 X |
| 6,208,995 B1 | 3/2001 | Himmel et al. | 707/104 |
| 6,226,648 B1 | 5/2001 | Appleman et al. | 707/102 |

FOREIGN PATENT DOCUMENTS

| | | | |
|---|---|---|---|
| EP | 1081607 A2 | 8/2000 | G06F/17/00 |
| GB | 2328300 A | 2/1999 | G06F/17/30 |

OTHER PUBLICATIONS

Foss, C., "Tools for Reading and Browsing Hypertext," Information Processing & Management, vol. 25 No. 4, pp. 407–418, Jan. 1989.

Brown, M., et al., "Deckscape: and Experimental Web Browser," Computer Networks & ISDN Systems, vol. 27 No. 6, pp. 1097–1104, Apr. 1995.

Card, S., et al., "The WebBook and Web Forager: an Information Workspace for the World Wide Web," Proc. Human Factors in Computing Systems 96, ACM No. —, pp. 111–117 (reprinted), Apr. 1996.

*Primary Examiner*—Heather R. Herndon
*Assistant Examiner*—Jeffrey A. Rossi
(74) *Attorney, Agent, or Firm*—Jeffrey S. Labaw (57) ABSTRACT

Concurrently displaying a set of pages in a distributed database with a minimum of user interaction is disclosed. A set of bookmarked web pages in a browser interface are concurrently displaying a list of bookmarks in the interface, each bookmark associated with a respective one of the web pages. At least a subset of the web pages are displayed in a cascade of windows, each web page assigned to a respective window in the cascade in the order in which the associated bookmark is listed in the list of bookmarks. Each window in the cascade is arranged so that a title bar is visible and the alphanumeric content of the title bar can be easily related to an entry in the bookmark list.

21 Claims, 4 Drawing Sheets

REQUESTING CONCURRENT ENTRIES VIA BOOKMARK SET

BACKGROUND OF THE INVENTION

This invention relates generally to information retrieval in a computer network. More particularly, it relates to an improved method for providing a set of bookmarks in a browser for retrieving Web pages in an Internet environment.

It is well known to couple a plurality of computer systems into a network of computer systems. In this way, the collective resources available within the network may be shared among users, thus allowing each connected user to enjoy resources which would not be economically feasible to provide to each user individually. With the growth of the Internet, sharing of computer resources has been brought to a much wider audience. The Internet has become a cultural medium in today's society for both information and entertainment. Government agencies employ Internet sites for a variety of informational purposes. For many companies, one or more Internet sites are an integral part of their business; these sites are frequently mentioned in the companies' television, radio and print advertising.

The World Wide Web, or simply "the Web", is the Internet's multimedia information retrieval system. It is the most commonly used method of transferring data in the Internet environment. Other methods exist such as the File Transfer Protocol (FTP) and Gopher, but have not achieved the popularity of the Web. Client machines accomplish transactions to Web servers using the Hypertext Transfer Protocol (HTTP), which is a known application protocol providing users access to files, e.g., text, graphics, images, sound, video, using a standard page description language known as the Hypertext Markup Language (HTML). HTML provides basic document formatting and allows the developer to specify "links" to other servers and files. In the Internet paradigm, a network path to a server is identified by a Uniform Resource Locator (URL) having a special syntax for defining a network connection.

Retrieval of information is generally achieved by the use of an HTML-compatible "browser", e.g., Netscape Navigator, at a client machine. When the user of the browser specifies a link via a URL, the client issues a request to a naming service to map a host name in the URL to a particular network IP address at which the server is located. The naming service returns a list of one or more IP addresses that can respond to the request. Using one of the IP addresses, the browser establishes a connection to a server. If the server is available, it returns a document or other object formatted according to HTML. Web browsers have become the primary interface for access to many network and server services.

The entry of the URL in the entry field of a browser can be a difficult task for many users. While the URL for the main Web page of a major company can be relatively brief, e.g., www.ibm.com, subsidiary pages can have very lengthy URLs in, at least to the average user, an arcane syntax. Recognizing the difficulties involved, the developers of browsers have provided one useful means of returning to a favorite URL, by the creation of user stored "bookmarks" in the browser.

Once created, bookmarks offer a means of page retrieval. The user can cause the browser to display his bookmark list and select among his bookmarks to go directly to a favorite page. Thus, the user is not forced to enter a lengthy URL nor retrace the original tortuous route through the Internet by which he may have arrived at the Web site. Once a bookmark is added to a bookmark list, in general, the bookmark becomes a permanent part of the browser until removed. The permanence and accessibility of bookmarks have made them a valuable means for personalizing a user's Internet access through the browser.

One problem which bookmarks do not currently address is that for a user to look at a set of related web pages a great deal of manual interaction with the browser is required. The user must manually select and possibly enter URLs for each of the related web pages. Usually, the user browses each of the pages serially in time in the single browser window. This makes it difficult to remember what one read, or where one read it, by the end of the session. It is possible to invoke multiple browser windows, however, this also requires substantial user interaction with the browser. Given the amount of manual activity required on the part of the user, it is easy to lose one's train of thought.

These problems as well as others are addressed in various embodiments of the present invention.

SUMMARY OF THE INVENTION

Therefore, it is an object of the invention to improve the use of bookmarks in the browser.

It is another object of the invention to use a bookmark set for a given client browser to concurrently initiate request for multiple related web pages.

It is another object of the invention to minimize the amount of manual entry required on the part of the user.

These and other objects of the invention are accomplished by concurrently displaying a set of bookmarked web pages in a browser interface. A list of bookmarks in the interface, each bookmark associated with a respective one of the web pages. At least a subset of the web pages are displayed in a cascade of windows, each web page assigned to a respective window in the cascade in the order in which the associated bookmark is listed in the list of bookmarks. Each window in the cascade is arranged so that a title bar is visible and the alphanumeric content of the title bar can be easily related to an entry in the bookmark list.

BRIEF DESCRIPTION OF THE DRAWINGS

These objects, features and advantages will be more readily understood with reference to the attached figures and following description.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system.

Figure 1:
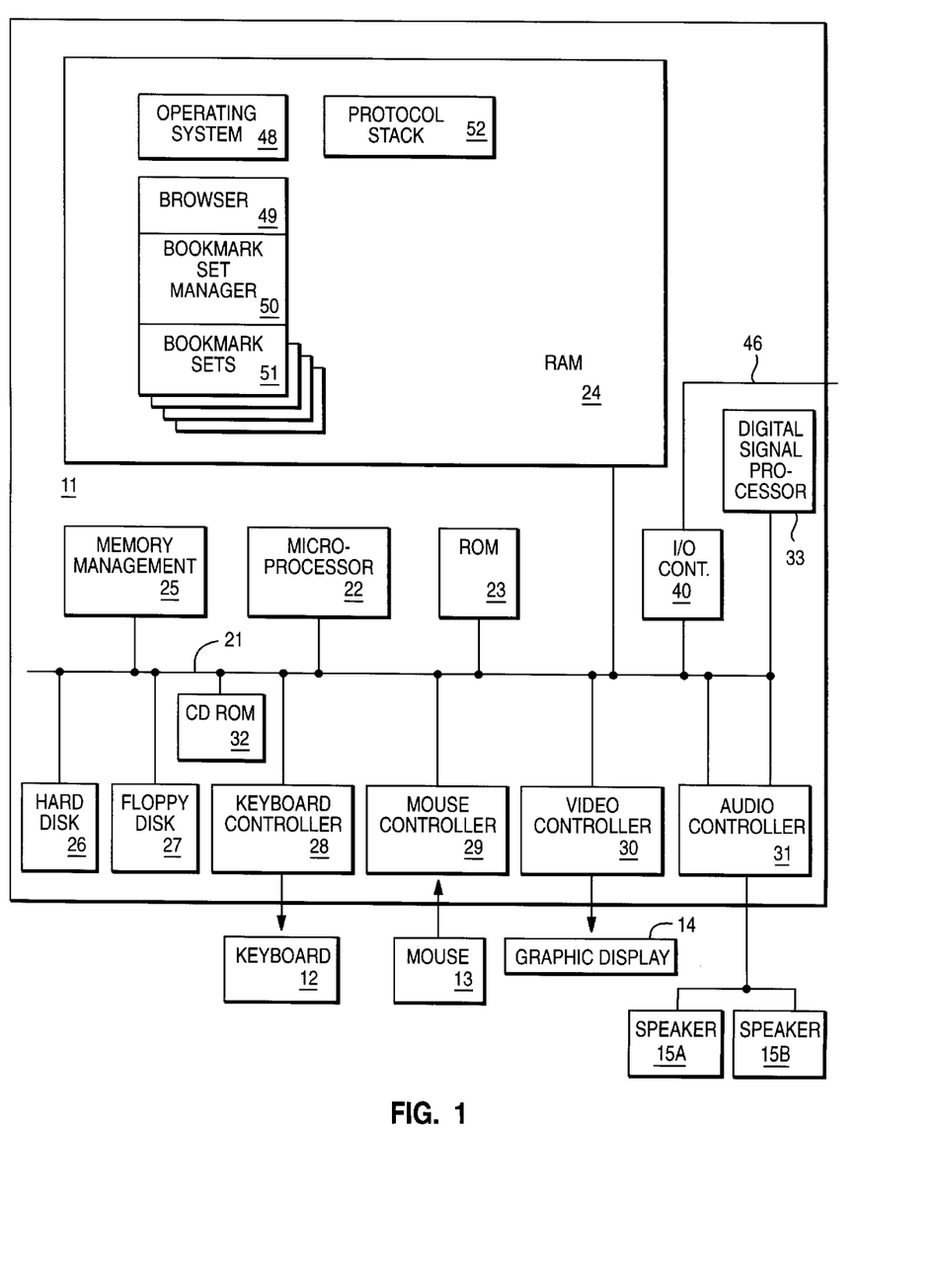
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

A web browser is a program that allows viewing the content of the Internet. A well known web browser is Netscape Navigator, however, many browsers exist. Some are general purpose and have many capabilities to provide a variety of functions. Other are less capable and special purpose. In general, a web browser is a program which is capable of parsing and presenting a document written in HTML, although those skilled in the art would appreciate that other markup languages such as dynamic HTML and XML will be used in the browsers of the future.

The idea of creating "bookmark sets" has been proposed by the inventors in copending, commonly assigned application, Ser. No. 08/977,634, Attorney Docket No. AT9-97-443 entitled "Web Browser Download of Bookmark Set", by Azua et al. filed Nov. 11, 1997, which is hereby incorporated by reference. In the referenced application, a bookmark set is associated with a web server and/or web page and downloaded to a client browser by either a push or pull operation. In some embodiments of the referenced application, the bookmark set is associated with a given web page which has already been located by the user. In other embodiments, a network administrator pushes a bookmark set as a means of controlling or guiding a set of client browsers.

In the present invention, the browser must also be equipped with a bookmark set manager, a software module which handles bookmark sets. Each bookmark set is comprised of referents, typically URLs, to various locations in the Internet as well as text descriptions of the locations. The bookmark manager is preferably part of the browser itself, but could be installed in the browser as a plug-in or Java applet.

Each bookmark entry is comprised of a URL to a web page and an associated descriptive text string which describes the web page in such a way to be easily recognized by the user. The descriptive text can be entered by the user when creating the bookmark set. The typical browser default, when the user does not enter any descriptive text, is to use the text within an embedded "title" tag which is often sent as part of the HTML header. Other information such as pointers to cached copies of the web page can be included in the bookmark entry.

By means of background, in the Internet, a Web server accepts a client request and returns a response back to the client. A series of server computers may be involved in the retrieval of a specific web page. The operation of the server program is governed by a number of server application functions (SAFs), each of which is configured to execute in a certain stop of a sequence. This sequence, illustrated in FIG. 2, begins with the authorization translation step 75 during which the web server translates any authorization information sent by the web client into a user and a group. If necessary, the step 75 may decode a message to get the actual client request. At the name translation step 77, the URL associated with the request may or may not be translated into a system-dependent file name, a redirection URL or a mirror site. In the path checks step 79, the server performs various tests on the resulting path to ensure that the given client may retrieve the document.

Figure 2:
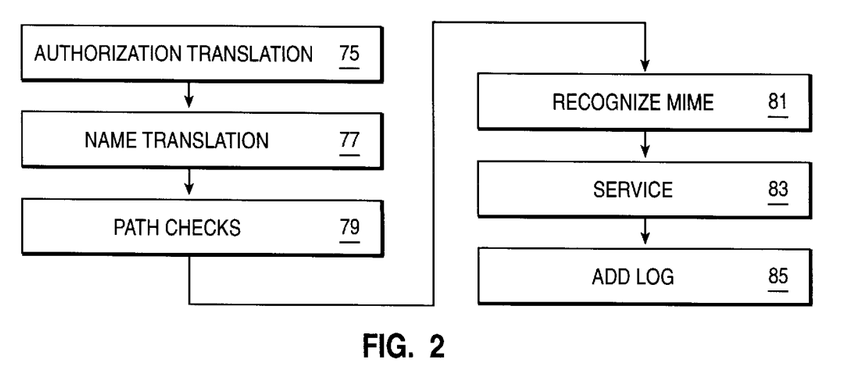
FIG. 2 depicts the processing of an HTTP request in the Internet environment.

In step 81, Multipurpose Internet Mail Extension (MIME) type information, e.g., text/html, image/gif, for the given document is recognized. In the service step 83, the Web server routine selects an internal server function to send the retrieved information back to the requesting web client. This function can run the normal server service routine to return a file or some other server function, such as a program to return a custom document or a CGI program. At the Add Log step 85, information about the transaction is recorded.

A URL or "Uniform Resource Locator" is defined in RFC 1945, which is incorporated herein by reference. As is well known, the URL is typically of the format: http://somehost/somedirectory?parameters . . . " where "somehost" is the hostname position of the URL, "somedirectory" is a directory in which the web page may be found. The usual manner in which a URL is resolved into an actual IP address for a web server is through the use of a name server. In an Internet or intranet network, a name server maps hostnames in URLs to actual network addresses. An example of a name server is the Domain Name Service (DNS) currently implemented in the Internet. The process of having a Web client request a hostname and address from a name server is sometimes called resolution. In TCP/IP, the name server resolves the hostname into a list of one or more IP addresses which are returned to the Web client on an HTTP request. Each IP address identifies a server which hosts the requested content made by the browser.

In one preferred embodiment, a bookmark set is an entity which has attributes of its own, e.g., active vs. inactive, and manages attributes and behavior, e.g., dynamic vs. static, of its individual bookmarks. Further, an action such as selection, deletion or e-mail transmission can be accomplished for the entire set in a single operation by the user. A bookmark set could be designated active in many ways. For example, a bookmark set can be activated through a browser configuration option. The browser can be configured so that a newly served bookmark automatically becomes the active bookmark set in the browser. Alternatively, a "Select active bookmark set" option in a bookmark pull down can used to specify the unique bookmark set that is active at any one session.

Figure 3:
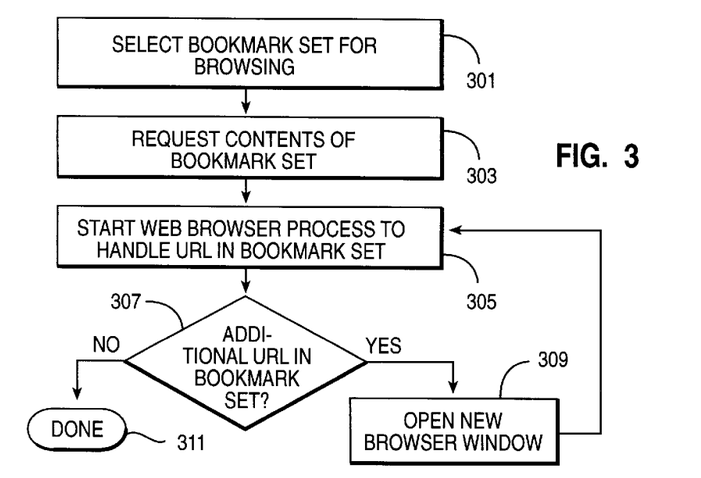
FIG. 3 shows a diagram of the overall process for using a bookmark set to retrieve multiple web pages in a distributed database environment.

The overall process is depicted in FIG. 3. In this particular embodiment, the bookmark set is selected at the client workstation, step 301. The creation of the bookmark set could be performed at the workstation, or it could be created at another system and be uploaded to a bookmark set server for subsequent download to the client workstation. The selection of the bookmark can be accomplished by highlighting a respective bookmark set in a list of bookmark sets stored in the browser.

In step 303, the user has requested to view the web pages associated with the bookmark set. In one preferred embodiment, a list of actions which can be performed on a selected bookmark set is available in the user interface of a browser. The action "View All Bookmarked Pages" in an action pull down menu could invoke the present invention.

In step 305, the typical actions are taken by the browser to present a bookmarked web page are taken by the browser. That is, the URL associated with the bookmark is retrieved and used to compose an HTTP request to the web server which serves web pages at the URL. The retrieved information, e.g., an HTML file, is parsed by the browser to present the page in the browser window. If there is only one bookmark in the bookmark set, step 307, the process can end. However, as is more likely, there are additional bookmarks in the bookmark set. In step 309, a new browser window is automatically opened by the browser and the process returns to step 305.

The loop of steps 305, 307 and 309 are repeated until there are no more bookmarks in the bookmark set. The process ends in step 311.

Figure 4:
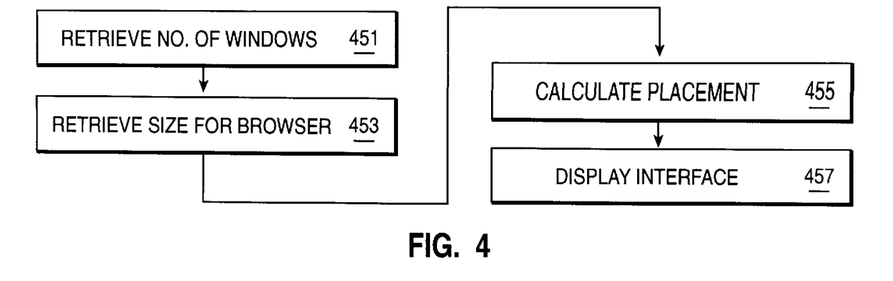
FIG. 4 is a flow diagram of placing the windows in the browser user interface to display the multiple web pages.
Figure 5:
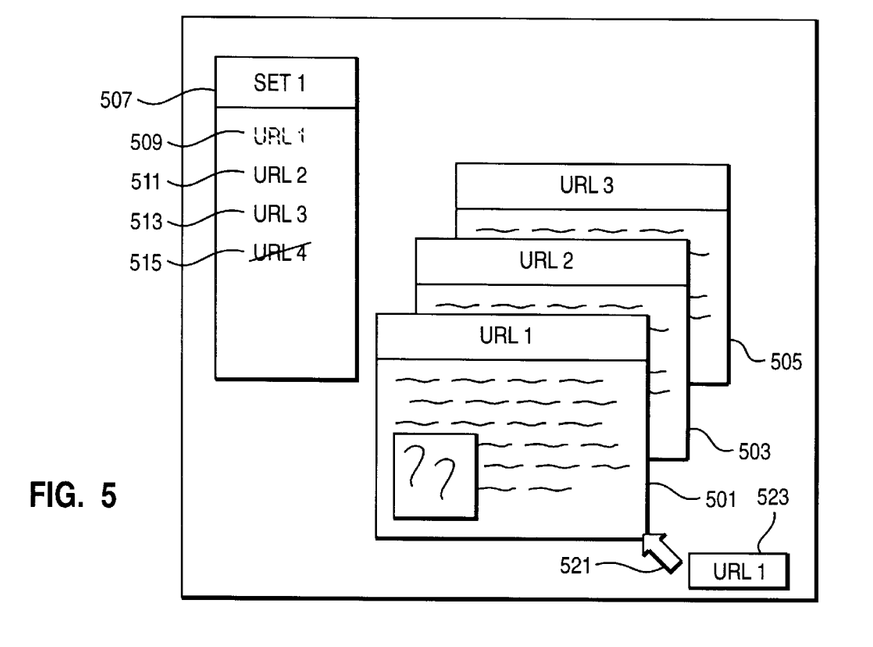
FIG. 5 is a diagram of one preferred user interface for the invention.

The process in FIG. 3 indicates that the browser windows are being presented in step 305 substantially similarly to the default presentation mode of the browser. This is one embodiment of the invention. If the browser is sized to present a full screen size window, each subsequent browser window covers each prior window substantially at full screen size. However, in the preferred embodiment, as shown in FIGS. 4 and 5, the browser windows are cascaded in a set of overlapping windows and a list of bookmarks in the bookmark set. This preferred embodiment allows easier navigation between windows and a record of which windows in the bookmark list are already visited by the user in the browsing process.

Referring to FIG. 4, the process begins in step 451 where the number of windows in the bookmark set is retrieved. Depending on the implementation, this may be simply be the number of bookmarks in the bookmark set, or the number of successfully retrieved pages. Since each of the windows in the cascade will require additional screen space and a slightly smaller size of the remainder of the windows, it might be desirable not to display windows for the pages which were not successfully retrieved. On the other hand, this will require more intelligence by the browser to discard the pages which indicate errors.

In step 453, the size of the browser window relative to the screen is retrieved. The browser may have all of the screen at its disposal or only a portion of the display. Next, in step 455, the placement of the browser windows for each of the bookmarks is calculated. The title bars of each window should ideally be visible so that the user can distinguish between the contents of each window. Thus, the height of the title bar becomes one criterion for placement of the windows. In the preferred embodiment, a list of the bookmarks is presented beside the cascade of bookmarks, and so in this embodiment, the placement of this list is also calculated. Another option is to cascade the bookmark entries like the browser windows as shown in FIG. 5 to associate the bookmark entry with the corresponding window. Finally, in step 457, the user interface as shown in FIG. 5 is displayed.

As shown in FIG. 5, a set of browser windows 501, 503 and 505 are displayed in a cascade formation, each for a respective bookmark in the bookmark set. To the side of the browser windows, the list 507 of bookmarks in the set is also displayed. In the initial display, the bookmark windows are displayed in the order in which they are listed in the bookmark set. Preferably, the cascade is spaced so that a least a title bar, e.g., containing the URL or bookmark title, for each window is exposed so that the user can determine the contents of the underlying windows 503, 505. Similarly, the list 507 of bookmarks also lists them in this order. In the list 507, the first bookmark 509 is greyed out, or presented in some different manner than the rest of the bookmarks 511, 513, to indicate that the web page has already been seen by the user. Also, in the list 507, a fourth bookmark 515 is shown crossed out to indicate that the web page for that bookmark was not retrieved successfully.

When a user clicks on the border of an underlying browser window, it is brought to the surface of the cascade. Thus, if the user clicked on window 503, the new order of windows in the cascade would be window 503, window 501 and window 505. Further, the list 507 of bookmarks in the window would be updated to reflect the new order. In addition, the bookmark listing 511 corresponding to window 503 would now be greyed out, since the user has seen the web page.

In the alternative, a user can click on the bookmark entry 511 in the list 507 to bring window 503 to the top of the cascade of windows. This action would also result in the reordering of the list 507 and the greying out of the entry 511. Thus, the user interface shown in FIG. 5 facilitates rapidly traversing between web pages in the bookmark set, understanding the order in which they can be or have been viewed and which of the web pages have been viewed. Once all of the web pages have been retrieved by the browser, the browsing experience of the user is near instantaneous access to any of the bookmarked pages. The initial presentation of the entire cascade may be somewhat slower, however, this can be ameliorated by presenting each page in the cascade as it is retrieved. For large bookmark sets, to maintain an acceptable browsing experience, partial presentation of the set is probably necessary. During the retrieval process, the windows can be refreshed and resized as necessary.

Only three bookmarked web pages are shown in the user interface of FIG. 5. However, many bookmark sets contain many more bookmarks. To present a large number of bookmarks, for example, thirty, in a cascade formation, the browser windows start to become very small or the title bars of underlying windows become invisible. Although the underlying windows can still be viewed by clicking on the bookmark list 507, access by clicking directly on the members of the cascade becomes less useful.

The inventors propose several ways to deal with this problem. First, there can be a minimum size to a browser window in the cascade. If there are too many browser windows to display usefully in the cascade, some number of web pages will not be displayed. However, they will be listed in the bookmark set list in a manner which indicates to the user that there are other web pages available. Clicking on the first nondisplayed bookmarked web page in the list would bring that web page to the top of the list. Alternatively, it might bring a group of nondisplayed web pages to the cascade.

Second, the requirement of displaying the title bar in the cascade can be suspended. As long as the separate windows can be discerned, they are selectable from the cascade. The user will simply need to refer to the bookmark set list to understand which of the bookmarked web pages he will be bringing to the top of the interface. As mentioned above, the list of bookmark entries could also be cascaded in the same manner and spacing as the browser windows. Thus, it would be easier for the user to understand the relationship of the browser window to the bookmark entry.

As shown in FIG. 5, an aid such as changing the pointer icon 521 to attach a field 523 which indicates which window is currently selectable by the mouse can be added to the user interface. There are many patents on changing the appearance of the mouse over certain features in the user interface. To implement this idea, the pointer icon 521 would change shape responsive to the operating system sensing its position over the edge of a browser window. The title bar information would be imported into the mouse pointer for display. While unneeded in the figure, since there are only three browser windows, this addition is thought to be useful in a situation where graphical features of the interface are tightly stacked.

Figure 6:
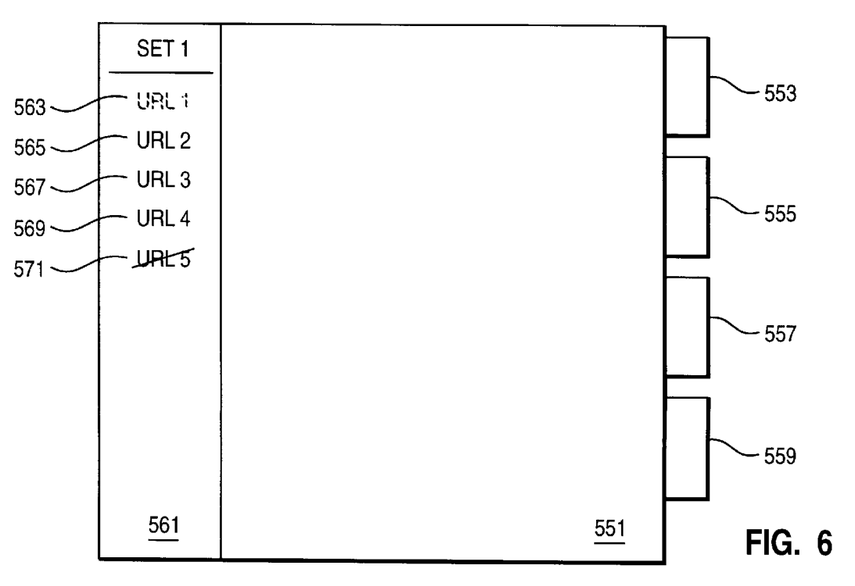
FIG. 6 shows a second embodiment of a user interface for the invention.

Third, an alternative notebook interface is shown in FIG. 6. This embodiment of the invention, rather than displaying the web pages in a cascade format, the web pages are assigned in pages in a notebook interface. This interface has the advantage of maintaining the size of the top browser window 551. However, in the cascade of windows, the user can resize and move windows so that the information in two web pages can be viewed side by side. The typical notebook interface does not allow the user to "tear off" pages of the notebook for a similar side by side comparison.

In the notebook, a set of tabs 553, 555, 557, 559 are presented for each of the selectable web pages in the bookmark set. The tabs can contain the title of the web page or the URL so that the user knows which page he is selecting. The bookmark set list 561 is presented as before with the bookmark entries 563, 565, 567, 569 in the order of the tabs 553–559. The first bookmark entry 561 is greyed out to denote that the corresponding web page, i.e. the top page, has been viewed by the user of the browser. The creation of this interface would involve using a generic a notebook template interface and dynamically retrieving the data to fill the template from many locations in the Internet.

The present invention is particularly desirable for web content creators who create bookmark sets. While the user can create bookmark sets of his own, it is probable that most bookmark sets will be created by web site designers. Thus, just as the bookmark set is sent as a unit to the browser, the corresponding web pages associated with a particular bookmark set can be assembled, and possibly compressed, and sent as a unit to the requesting web browser. Obviously, the assembled and compressed pages should be periodically updated to make sure that they were current. The compressed web pages can be sent with the initial request of the bookmark set or separately upon the request of the user. The former has the advantage of near instantaneous response to the user at a cost of using some of the cache space. Since the user might not wish to view the web pages in the bookmark set immediately, those viewed by the user might flush the assembled pages out of the cache prior to viewing. Thus, they should be available upon subsequent invocations of the invention. While the browser will need to be able to detect compression and decompress the web pages associated with the bookmark set, this capability is expected in future browsers.

Figure 7:
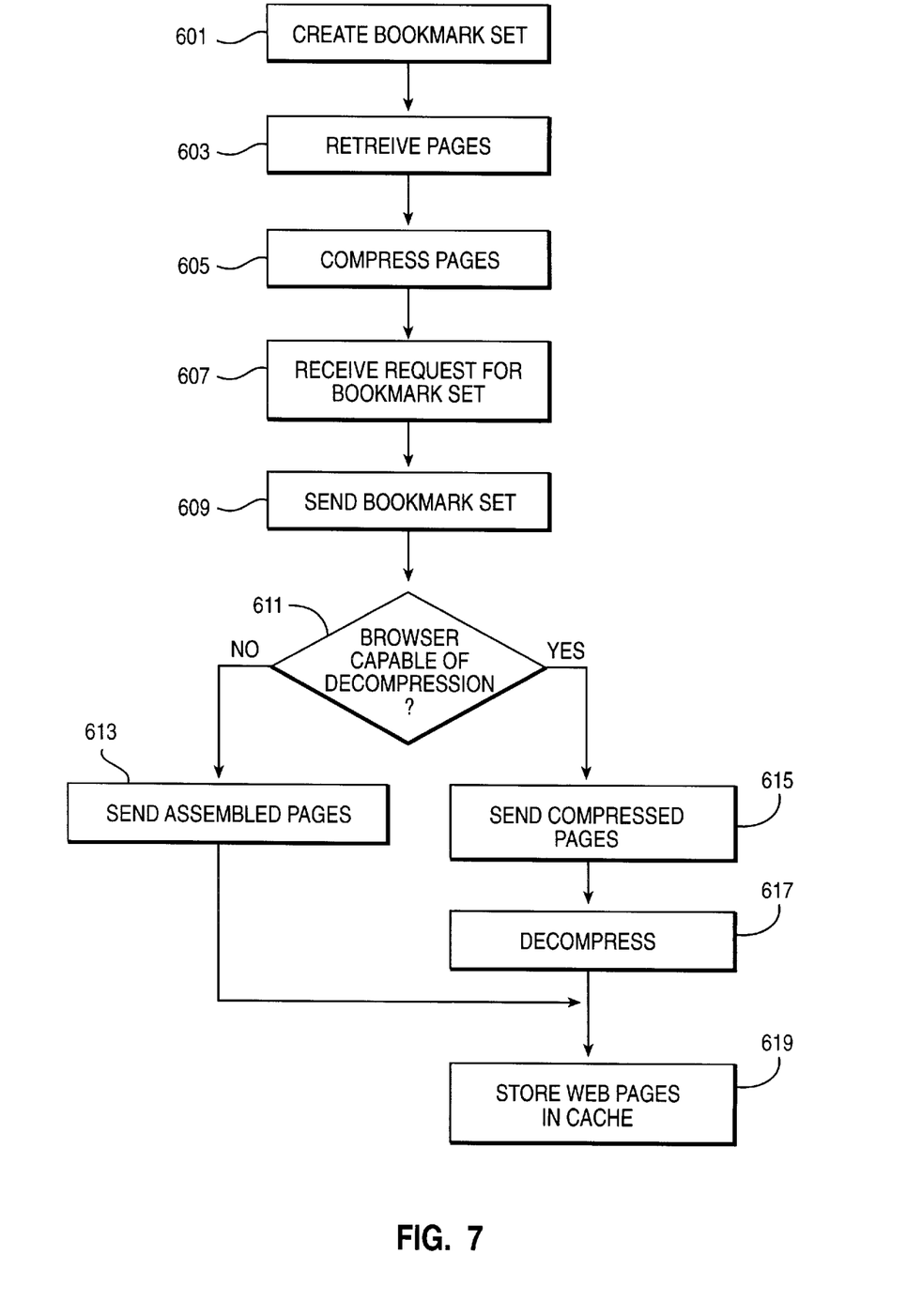
FIG. 7 is a flow diagram for creating a bookmark set.

One preferred embodiment is described below in connection with FIG. 7. Step 601 depicts the creation of the bookmark set. Although depicted as a single step, it may actually represent a great deal of research activity for available web pages and possibly the creation of web pages and placing a web server in operation. The bookmark set itself primarily contains the URLs to a selected set of web pages. Generally, each bookmark is associated with the descriptive text so that a user can understand the general content of the page without actually retrieving the page. Other information such as keywords or an abstract could be included in the bookmark set entry of the present invention. The entry of the bookmark set data could be accomplished manually in a FTP form. Alternatively, editing tools to generate bookmark sets can be developed.

A sample bookmark set for "patent law" or "patent lawyer" follows:

| | |
|---|---|
| www.iplaw.com | Intellectual Property Law |
| www.iplaw.com/pat/index/html | Patent page |
| www.iplaw.com/copy/index/html | Copyright page |
| www.iplaw.com/mark/index/html | Trademark page |
| www.uspto.gov | U.S. Pat. Office |
| cweb.loc.gov | Copyright Office |
| www.smartrwe.com | Law firm |

The majority of the bookmark set includes URLs to useful articles and links to Intellectual Property sites. An "advertising" bookmark, www.smartrwe.com, for a law firm providing intellectual property services is also included in the bookmark set.

In step 603, the bookmark set server upon installation of the bookmark set, begins to retrieve current versions of the web pages from the URLs listed in the bookmark set. After the pages are retrieved, a compressed version of the web pages is also made and kept at the server. Depending on the capabilities of the browser, either the assembled or compressed version of the web pages can be served.

Once the server is has assembled, compressed and stored the bookmark set and its associated pages, the bookmark set server makes the new bookmark set available to potential customers. Posting adds the bookmark set to a database organized for future searching. In step 607, the server has received a request for the bookmark set. In step 609, the bookmark set is sent to the requesting client.

While the assembled pages could be automatically sent to the client browser with the bookmark set, it is preferred to present a panel to the user asking whether he wishes the web pages associated with the downloaded bookmark set to be downloaded as well. In response to a positive selection, the process continues. In step 611, a test is performed to determine whether the browser is capable of handling the compressed version of the web pages, i.e. decompression. Generally, as part of the HTTP request, the client browser includes information such as browser type and installed plug-ins. This information can be correlated against a table of browsers which are decompression capable.

If the browser does not have a decompression routine, the assembled pages are sent, step 613. If the browser is compression capable in step 615 the compressed version of the web pages are sent. In step 617, the browser decompresses the web pages. The web pages are stored in the cache, step 619, for future use by the browser.

In the flow diagram, the web pages are stored in an uncompressed state in the cache to make them more immediately available to the browser when the process of the present invention, i.e. display of multiple web pages, is invoked. However, to save cache space, they could be stored in their compressed state, presuming that compression was compatible with the cache and the presentation process of the browser when retrieving pages from the cache.

From a user interface standpoint, it is a single step process to add a bookmark set in an easy, automatic and painless way. A special tag or MIME type can identify the nature of the file, i.e. a bookmark set, to be transferred. The bookmark set manager in the browser uses these tags or MIME types to add the bookmark set to the browser's collection of bookmarks. In one preferred embodiment, upon receipt of the new bookmark set, the bookmark set manager makes the new set the active bookmark set and thus rendering the included URLs available for browser use immediately.

One feature of the invention allows the user to assign an attribute to the newly served bookmark set. At download, a dialog box is presented, asking the user if the bookmark set is to be a temporary or permanent bookmark set. A temporary bookmark set is a good choice for a search which will not last beyond the current session. If a permanent bookmark set is chosen, the bookmark set becomes a permanent part of the browser (until deleted). Next, another dialog box is presented, asking the user if he wants to subscribe to the bookmark list for updates.

In the preferred embodiment, a bookmark set is detected by the browser by parsing the HTML returned by the server for a unique tag. That is, the bookmark set is specified through a unique MIME type, e.g., x-bookmark-set, that is added to the browser's bookmark options. For example, the HTML for adding a bookmark set for a computer manufacturer would look like:

Content_type: text/Bookmark set<line feed><line feed>
<HTML>
<HEAD><TITLE>GM Bookmark sets</TITLE></HEAD>
. . .
</HTML>

While many industries that can benefit from aggregating web based information as prepackaged URLs, i.e. as bookmark sets, which are retrievable based on predetermined search criteria, a few examples are given below.

For example, a research institution or company can benefit from pre-packaging book information by "topics" or "authors" on sets of URLs, i.e. bookmark sets, that can direct the user to the electronic review of the selected subject. A student performing research on Shakespeare should be able to search for a bookmark set on Shakespeare, probably one of many, and download the selected bookmark set to his/her computer to review a selected set of "most important" URLs related to Shakespeare. As mentioned above, using today's available search technology, independently repeating this research takes a considerable amount of time to collect meaningful URLs.

Another application of the invention would be for a hospital or doctor to advertise their services. Bookmark sets on "cancer", "breast cancer", "heart disease" and so forth would include bookmarks to web pages containing articles on such topics. In addition, these bookmark sets would contain bookmarks to a hospital or doctor offering services for these conditions. The better the set of articles, the more likely a patient would be inclined to contact the doctor or hospital included in the bookmark set. Thus, there exists a potential market for bookmark set providers, either to provide a bookmark set to the hospital on a one time fee basis or as an ongoing fee as an advertisement.

Yet another application would be an online travel site. With the input of a destination keyword, e.g., Orlando, the client browser could be served a bookmark set complete with URLs to hotel and restaurant guides for the area, vacation club materials, weather reports and a web page integrating air, car and hotel reservations customized for the client.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method for concurrently displaying a set of bookmarked web pages in a browser interface, comprising the steps of:
   displaying a list of bookmarks in the browser interface, each bookmark associated with a respective one of the web pages;
   displaying at least a subset of the web pages in a cascade of windows, each web page assigned to a respective window in the cascade in the order in which the associated bookmark is listed in the list of bookmarks, wherein each window in the cascade is arranged so that a title bar is visible and the alphanumeric content of the title bar can be easily related to an entry in the bookmark list.

2. The method as recited in claim 1, further comprising the steps of:
   requesting at least a subset of the web pages from web sites coupled to a network; and
   responsive to a failure of retrieve a respective web page, marking the associated entry in the bookmark list to indicate that the page is not presented in the cascade.

3. The method as recited in claim 1, further comprising the steps of;
   responsive to user selection of a border area of an underlying window in the cascade, bringing the selected window to the top of the cascade; and
   reordering the bookmark list to reflect the order of the web pages in the cascade.

4. The method as recited in claim 1, further comprising the steps of:
   responsive to user selection of a bookmark entry in the bookmark list, bringing the window associated with the selected bookmark entry to the top of the cascade; and
   reordering the bookmark list to reflect the order of the web pages in the cascade.

5. The method as recited in claim 1, wherein the bookmark list contains too many bookmarks for all associated web pages to be displayed in the cascade properly, and further comprises the steps of:
   determining how many windows can be properly displayed in the cascade in a display space allotted to the browser;
   presenting web pages in the determined number of windows in the cascade;
   wherein the bookmark entries in the bookmark list are displayed in a manner to indicate which of the associated windows are displayed in the cascade.

6. The method as recited in claim 5, further comprising the steps of:
   responsive to user selection of a bookmark entry associated with a nondisplayed web page, Determining a set of web pages to be displayed with the associated web page; and
   displaying the associated web page in a top window in the cascade and the determined set of web pages are assigned to other windows in the cascade.

7. The method as recited in claim 1, wherein the bookmark entries are cascaded in an analogous manner to the windows in the cascade.

8. A system including processor, memory and display for concurrently displaying a set of bookmarked web pages in a browser interface, comprising:
   means for Displaying a list of bookmarks in the browser interface, each bookmark associated with a respective one of the web pages;
   means for Displaying at least a subset of the web pages in a cascade of windows, each web page assigned to a respective window in the cascade in the order in which the associated bookmark is listed in the list of bookmarks, wherein each window in the cascade is arranged so that a title bar is visible and the alphanumeric content of the title bar can be easily related to an entry in the bookmark list.

9. The system as recited in claim 8, further comprising:
   means for requesting at least a subset of the web pages from web sites coupled to a network; and
   means Responsive to a failure of retrieve a respective web page for marking the associated entry in the bookmark list to indicate that the page is not presented in the cascade.

10. The system as recited in claim 8, further comprising:
    means Responsive to user selection of a border area of an underlying window in the cascade for bringing the selected window to the top of the cascade; and
    means for Reordering the bookmark list to reflect the order of the web pages in the cascade.

11. The system as recited in claim 8, further comprising;
    means Responsive to user selection of a bookmark entry in the bookmark list for bringing the window associated with the selected bookmark entry to the top of the cascade; and
    means for Reordering the bookmark list to reflect the order of the web pages in the cascade.

12. The system as recited in claim 8, wherein the bookmark list contains too many bookmarks for all associated web pages to be displayed in the cascade properly, and further comprises:
    means for Determining how many windows can be properly displayed in the cascade in a display space allotted to the browser;
    means for Presenting web pages in the determined number of windows in the cascade;
    wherein the bookmark entries in the bookmark list are displayed in a manner to indicate which of the associated windows are displayed in the cascade.

13. The system as recited in claim 12, further comprising:
    means Responsive to user selection of a bookmark entry associated with a nondisplayed web page for determining a set of web pages to be displayed with the associated web page; and
    means for Displaying the associated web page in a top window in the cascade and the determined set of web pages are assigned to other windows in the cascade.

14. The system as recited in claim 8, wherein the bookmark entries are cascaded in an analogous manner to the windows in the cascade.

15. A computer program product in a computer readable medium for concurrently displaying a set of bookmarked web pages in a browser interface, comprising:
    means for Displaying a list of bookmarks in the browser interface, each bookmark associated with a respective one of the web pages;
    means for Displaying at least a subset of the web pages in a cascade of windows, each web page assigned to a associated bookmark is listed in the list of bookmarks, wherein each window in the cascade is arranged so that a title bar is visible and the alphanumeric content of the title bar can be easily related to an entry in the bookmark list.

16. The product as recited in claim 15, further comprising:

means for requesting at least a subset of the web pages from web sites coupled to a network; and means Responsive to a failure of retrieve a respective web page for marking the associated entry in the bookmark list to indicate that the page is not presented in the cascade.

17. The product as recited in claim 15, further comprising;

Means Responsive to user selection of a border area of an underlying window in the cascade for bringing the selected window to the top of the cascade; and means for Reordering the bookmark list to reflect the order of the web pages in the cascade.

18. The product as recited in claim 15, further comprising:

means Responsive to user selection of a bookmark entry in the bookmark list for bringing the window associated with the selected bookmark entry to the top of the cascade; and means for Reordering the bookmark list to reflect the order of the web pages in the cascade.

19. The product as recited in claim 18, wherein the bookmark list contains too many bookmarks for all associated web pages to be displayed in the cascade properly, and further comprises:

means for Determining how many windows can be properly displayed in the cascade in a display space allotted to the browser;

means for Presenting web pages in the determined number of windows in the cascade;

wherein the bookmark entries in the bookmark list are displayed in a manner to indicate which of the associated windows are displayed in the cascade.

20. The product as recited in claim 19, further comprising:

means Responsive to user selection of a bookmark entry associated with a nondisplayed web page for determining a set of web pages to be displayed with the associated web page; and means for Displaying the associated web page in a top window in the cascade and the determined set of web pages are assigned to other windows in the cascade.

21. The product as recited in claim 15, wherein the bookmark entries are cascaded in an analogous manner to the windows in the cascade.

* * * * *

UNITED STATES PATENT AND TRADEMARK OFFICE
CERTIFICATE OF CORRECTION

PATENT NO.   : 6,405,222 B1
DATED        : June 11, 2002
INVENTOR(S)  : Kunzinger et al.

It is certified that error appears in the above-identified patent and that said Letters Patent is hereby corrected as shown below:

Title page,
Item [74], *Attorney, Agent or Firm*, please delete "Labaw" and insert -- LaBaw --;

Column 2,
Line 30, please insert paragraph after "user." -- It is another object of the invention to improve the ease of viewing multiple related web pages. --.

Signed and Sealed this

Seventeenth Day of December, 2002

JAMES E. ROGAN
*Director of the United States Patent and Trademark Office*